(12) United States Patent
Margrill

(10) Patent No.: US 10,403,182 B2
(45) Date of Patent: Sep. 3, 2019

(54) SYSTEMS AND METHODS FOR PROVIDING SOLAR-POWERED ADVERTISING KIOSKS

(71) Applicant: Anita Margrill, San Francisco, CA (US)

(72) Inventor: Anita Margrill, San Francisco, CA (US)

(*) Notice: Subject to any disclaimer, the term of this patent is extended or adjusted under 35 U.S.C. 154(b) by 0 days.

(21) Appl. No.: 15/939,124

(22) Filed: Mar. 28, 2018

(65) Prior Publication Data
US 2018/0293921 A1 Oct. 11, 2018

Related U.S. Application Data

(60) Provisional application No. 62/479,227, filed on Mar. 30, 2017.

(51) Int. Cl.
*G09F 13/00* (2006.01)
*G09F 13/22* (2006.01)
(Continued)

(52) U.S. Cl.
CPC .............. *G09F 13/22* (2013.01); *G09F 19/22* (2013.01); *G09F 19/226* (2013.01); *H02S 20/23* (2014.12); *H02S 40/38* (2014.12); *H02S 99/00* (2013.01); *G09F 13/0413* (2013.01); *G09F 2013/045* (2013.01); *G09F 2013/0418* (2013.01); *Y02B 10/12* (2013.01); *Y02E 10/50* (2013.01)

(58) Field of Classification Search
CPC .............. G09F 19/226; G09F 13/0413; G09F 2013/0418; H02S 40/38; H02S 20/23; H02S 99/00
See application file for complete search history.

(56) References Cited

U.S. PATENT DOCUMENTS 6,951,291 B2 * 10/2005 Kleanthis ................ G09F 15/00
 211/163
9,728,665 B2 * 8/2017 Ronda ................... H01L 31/055
(Continued)

FOREIGN PATENT DOCUMENTS

CN 201065655 Y 5/2008
KR 20120119243 A 10/2012
(Continued)

OTHER PUBLICATIONS

International Application No. PCT/US2018/025245, International Search Report and Written Opinion dated Jun. 27, 2018.
(Continued)

*Primary Examiner* — Patrick J Maestri
(74) *Attorney, Agent, or Firm* — Sheppard Mullin Richter & Hampton LLP

(57) ABSTRACT

A solar-powered advertising kiosk can include a frame configured to divide the solar-powered advertising kiosk into one or more sections. The solar-powered advertising kiosk can also include a roof configured to convert sunlight to electricity to power one or more advertising displays, wherein the roof includes a first portion of the frame, and wherein the roof includes one or more solar tents each including one or more solar modules. The solar-powered advertising kiosk can further include a body configured to display one or more images on the one or more advertising displays, wherein the body includes a second portion of the frame.

20 Claims, 15 Drawing Sheets

(51) Int. Cl.
    *H02S 20/23*     (2014.01)
    *H02S 40/38*     (2014.01)
    *H02S 99/00*     (2014.01)
    *G09F 19/22*     (2006.01)
    *G09F 13/04*     (2006.01)

(56) References Cited

U.S. PATENT DOCUMENTS

| | | | |
|---|---|---|---|
| 2008/0067227 A1 | 3/2008 | Poss | |
| 2014/0153226 A1* | 6/2014 | Hoang | F03D 9/00 362/183 |
| 2016/0270563 A1 | 9/2016 | Contrata, Jr. | |

FOREIGN PATENT DOCUMENTS

| | | | |
|---|---|---|---|
| KR | 200467015 | Y1 | 5/2013 |
| KR | 101631106 | B1 | 6/2016 |

OTHER PUBLICATIONS

City of New York, "Mayor de Blasio Announces Public Launch of LinkNYC Program, Largest and Fastest Free Municipal Wi-Fi Network in the World," Feb. 18, 2016.
CityBridge LLC, "LinkNYC Beta: Features Fact Sheet," 2016.
Corning Incorporated, "Corning Gorilla Glass for Large Format Applications," product brochure, Sep. 2015.
JCDecaux North America, Inc., "Street Furniture Advertising," 2016 [retrieved online at https://www.jcdecauxna.com/street-furniture/street-furniture-advertising on Sep. 13, 2016].
Morningstar Corporation, "SunSaver MPPT: Solar Controller with Maximum Power Point Tracking," product brochure, 2014.
Phoenix Kiosk, Inc., "Looking for a Quick and Easy Kiosk Solution? Check Out Our Outdoor Kiosks," product brochure, 2016.
Solarkiosk AG Aktiengesellschaft (AG), "SolarKiosk," U.S. Appl. No. 79/180,891, filed Jul. 28, 2015.
Solarkiosk AG Aktiengesellschaft (AG), "SolarKiosk," U.S. Appl. No. 79/181,763, filed May 27, 2015.
Wikimedia Foundation, Inc., "Strawberry Tree (solar energy device)," Wikipedia online encyclopedia entry, May 3, 2015 [retrieved online at https://en.wikipedia.org/wiki/Strawberry_Tree_(solar_energy_device) on Jan. 25, 2016].

\* cited by examiner

US 10,403,182 B2

SYSTEMS AND METHODS FOR PROVIDING SOLAR-POWERED ADVERTISING KIOSKS

CROSS-REFERENCE TO RELATED APPLICATIONS

This application claims the benefit of U.S. Provisional Application No. 62/479,227, filed Mar. 30, 2017 and entitled "SYSTEMS AND METHODS FOR PROVIDING SOLAR-POWERED ADVERTISING KIOSKS," which is incorporated herein by reference in its entirety, including appendices.

FIELD OF THE INVENTION

The present technology relates to the field of display advertising. More particularly, the present technology relates to techniques for providing solar-powered advertising kiosks.

BACKGROUND

Companies may utilize display advertising to introduce products to audiences, for example, in large metropolitan areas. Advertising kiosks can be provided in areas of high foot traffic, such as bus stations, train stations, shopping centers, city sidewalks, city centers, etc.

SUMMARY

A solar-powered advertising kiosk can include a frame configured to divide the solar-powered advertising kiosk into one or more sections. The solar-powered advertising kiosk can also include a roof configured to convert sunlight to electricity to power one or more advertising displays, wherein the roof includes a first portion of the frame, and wherein the roof includes one or more solar tents each including one or more solar modules. The solar-powered advertising kiosk can further include a body configured to display one or more images on the one or more advertising displays, wherein the body includes a second portion of the frame.

A method can include providing a solar-powered advertising kiosk including: a frame configured to divide the solar-powered advertising kiosk into one or more sections; a roof configured to convert sunlight to electricity to power one or more advertising displays, wherein the roof includes a first portion of the frame, and wherein the roof includes one or more solar tents each including one or more solar modules; and a body configured to display one or more images on the one or more advertising displays, wherein the body includes a second portion of the frame. The method can also include converting sunlight to electricity to power the one or more advertising displays. The method can further include displaying one or more images on the one or more advertising displays.

In an embodiment, the first portion includes one or more framing rafters.

In an embodiment, the second portion includes one or more framing panels.

In an embodiment, a framing post can be configured to fit with the one or more framing rafters to form the roof and to fit with the one or more framing panels to form the body.

In an embodiment, the one or more solar modules are bifacial solar modules.

In an embodiment, the one or more solar modules include a protective cover on at least one surface of the one or more solar modules.

In an embodiment, the protective cover is configured to allow passage of light of a particular wavelength or a particular range of wavelength.

In an embodiment, the one or more solar modules include one or more light emitting diode (LED) lights.

In an embodiment, a battery can store the electricity.

In an embodiment, control electronics can control the battery.

It should be appreciated that many other features, applications, embodiments, and/or variations of the disclosed technology will be apparent from the accompanying drawing and from the following detailed description. Additional and/or alternative implementation of the structure, systems, and methods described herein can be employed without departing from the principles of the disclosed technology.

Figure 1:
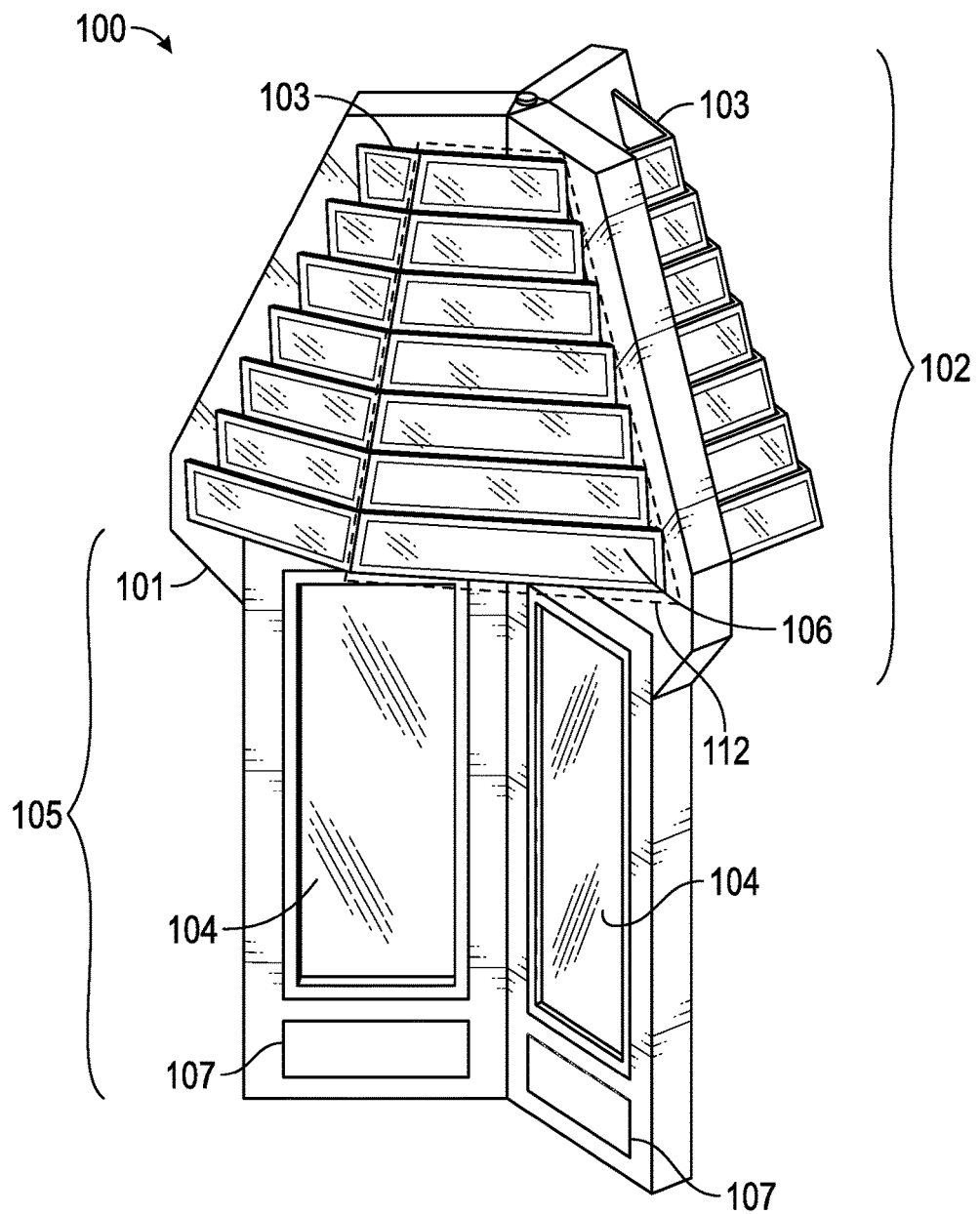
FIG. 1 provides a perspective view of a solar-powered advertising kiosk, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Solar-Powered Advertising Kiosk

Companies can often use display advertising to introduce products, services, ideas, etc. to consumers. In some cases, display advertisements can be provided in advertising kiosks. Advertising kiosks can be provided in areas of high foot traffic, for example, in order to increase visibility and accessibility.

Under conventional approaches, advertising kiosks may not include light sources. For example, no lighting may be provided for display advertisements, and it may be difficult to see the content of display advertisements under certain lighting conditions. In some cases, under conventional approaches, advertising kiosks may include light sources, but the light sources may need to be connected to external power sources, such as an electric grid. Accordingly, setting up and maintaining advertising kiosks can involve significant resources and steps. In addition, because such advertising kiosks rely on external power sources, the advertising kiosks may not be efficient in energy use.

Accordingly, in order to address these and other challenges, the disclosed technology can provide a solar-powered advertising kiosk. A solar-powered advertising kiosk can include one or more solar modules or solar panels to generate electricity from sunlight. The solar-powered advertising kiosk can also include a battery to store generated electricity. In some cases, the solar-powered advertising kiosk can be powered entirely by solar power. In other cases, the solar-powered advertising kiosk can be powered by a combination of solar power and other sources of power (e.g., an electrical grid, wind power, etc.). The solar-powered advertising kiosk can include one or more advertising displays that can be used to display advertisements, public announcements, etc. For example, the solar-powered advertising kiosk can include one or more lightboxes with internal lighting for displaying advertisements and/or other materials. In some cases, solar modules or solar panels can be protected by a cover, for example, made from glass and/or other materials. In this way, the disclosed technology can provide an innovative, freestanding, three-dimensional solar-powered media platform, which can be used for various purposes (e.g., including advertising and public notice displays). Solar-powered advertising kiosks can be energy efficient and use clean or renewable energy. Solar-powered advertising kiosks can also provide a source of revenue for entities associated with the solar-powered advertising kiosks. Details relating to the disclosed technology are provided below.

Figure 2:
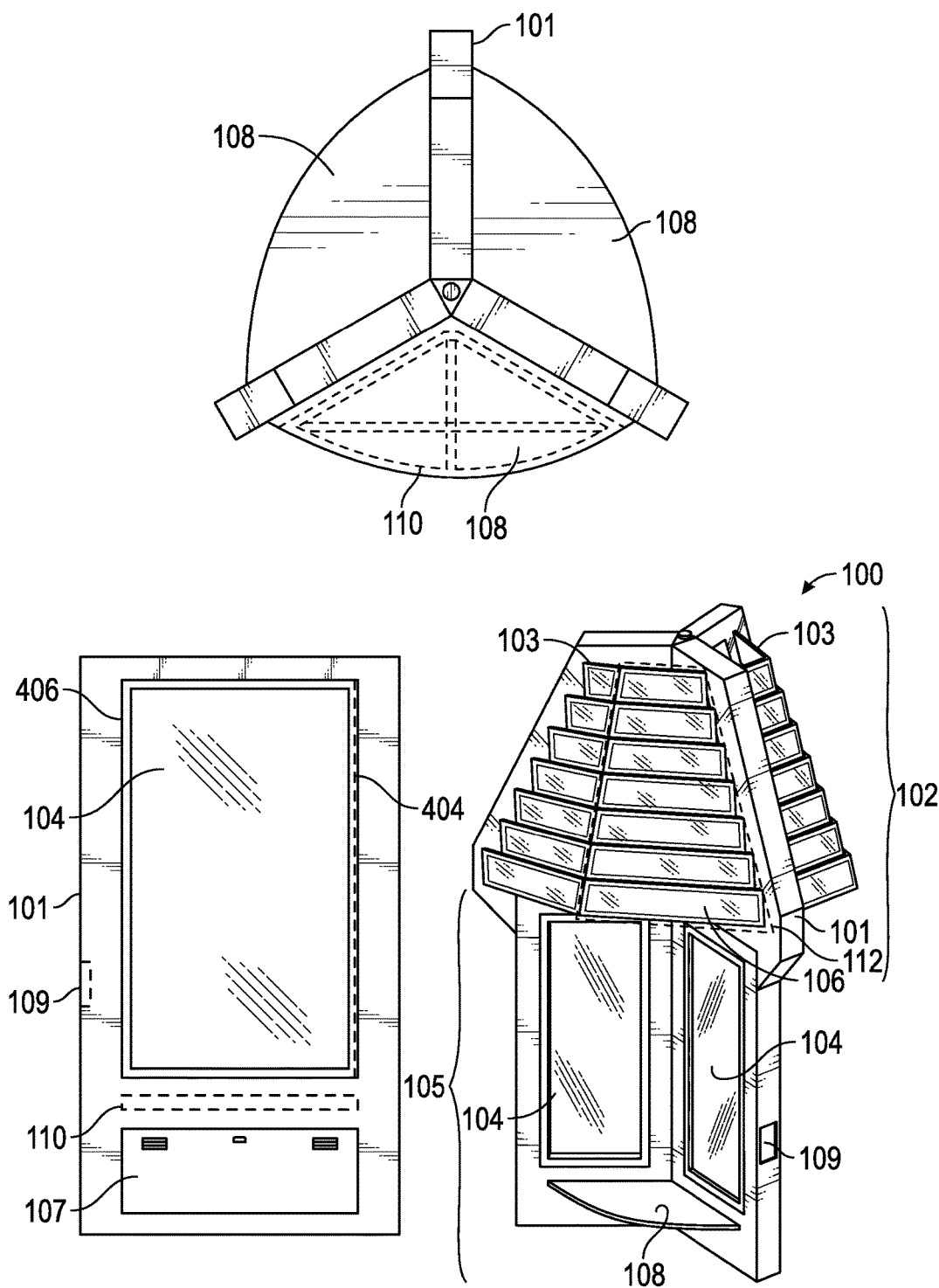
FIG. 2 provides a top-down view and a perspective view of a solar-powered advertising kiosk including one or more seat surfaces, according to an embodiment of the present disclosure.
Figure 3:
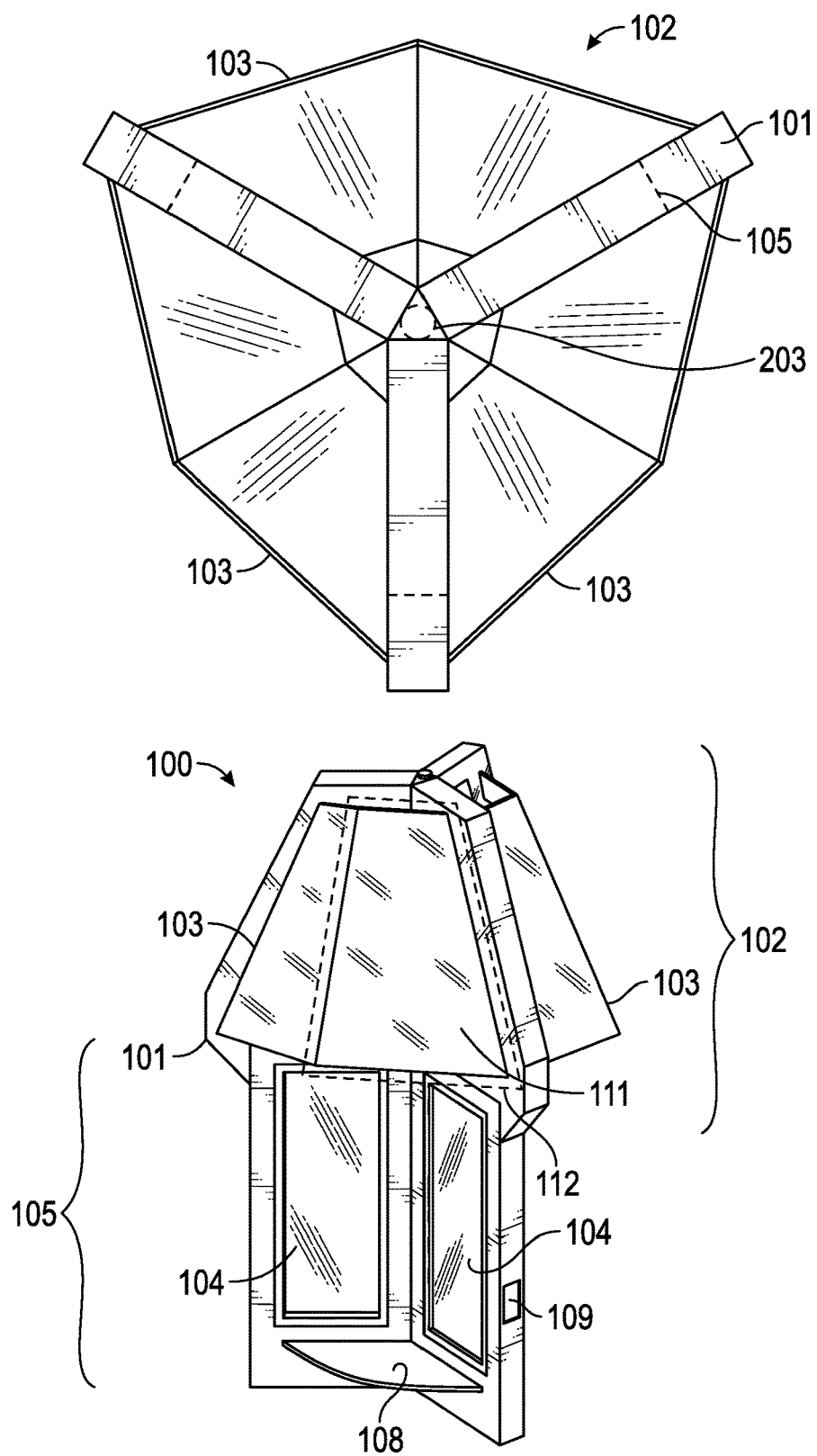
FIG. 3 provides a top-down view and a perspective view of a solar-powered advertising kiosk including one or more solar sheets, according to an embodiment of the present disclosure.
Figure 4:
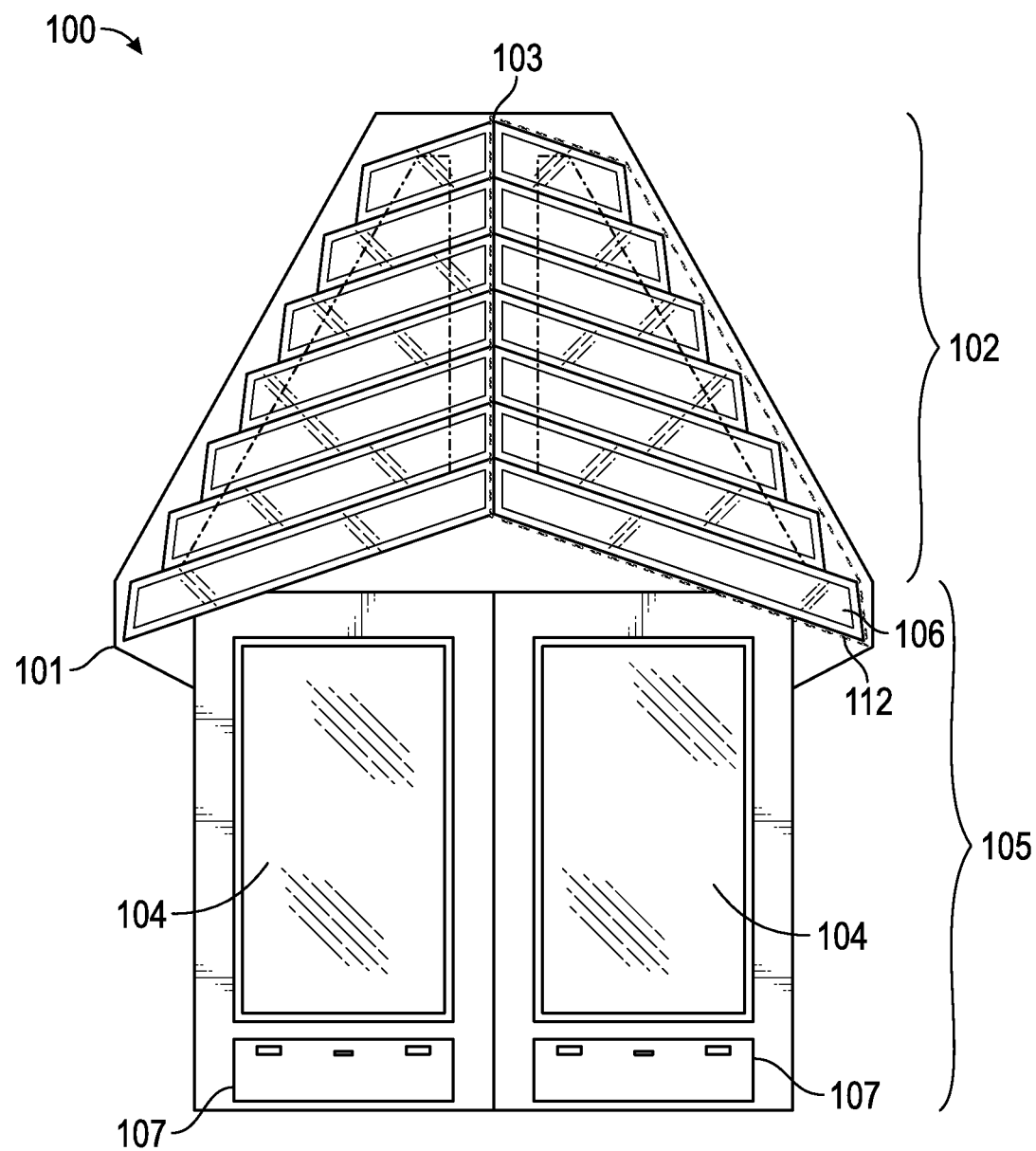
FIG. 4 provides a front plan view of a solar-powered advertising kiosk, according to an embodiment of the present disclosure.

FIGS. 1-4 provide various views of a solar-powered advertising kiosk 100, according to various embodiments of the present disclosure. FIG. 1 provides a perspective view of a solar-powered advertising kiosk 100, according to an embodiment of the present disclosure. FIG. 2 provides a top-down view and a perspective view of a solar-powered advertising kiosk 100 including one or more seat surfaces, according to an embodiment of the present disclosure. FIG. 3 provides a top-down view and a perspective view of a solar-powered advertising kiosk 100 including one or more solar sheets, according to an embodiment of the present disclosure. FIG. 4 provides a front plan view of a solar-powered advertising kiosk 100, according to an embodiment of the present disclosure. The solar-powered advertising kiosk 100 can include a frame 101, a roof 102 including one or more solar tents 103, and a body 105. The body 105 can include one or more advertising displays 104. The solar-powered advertising kiosk 100 can also include a storage compartment 107. In some embodiments, the solar-powered advertising kiosk 100 can also include one or more seat surfaces 108 and one or more charging stations 109. The components shown in the figures herein are exemplary only, and other implementations may include additional, fewer, integrated, or different components. Some components may not be shown so as not to obscure relevant details. Further, it should be understood that various components or illustrations in the figures herein may not be drawn to scale.

The frame 101 can divide the solar-powered advertising kiosk 100 into one or more sections. In the examples of FIGS. 1-4, the frame 101 divides the solar-powered advertising kiosk 100 into three sections. The frame 101 can include one or more parts and can be made from any material. In an embodiment, the frame 101 can be made of metal and/or metal alloys, such as steel, stainless steel, aluminum, etc. In another embodiment, the frame 101 can be made of naturally occurring materials, such as wood, marble, etc. In yet another embodiment, the frame 101 can be made of any suitable synthetic materials, such as plastic, carbon-graphite, drywall, etc. In some embodiments, the frame 101 can be made of any combination of metal, metal alloys, naturally occurring materials, and/or synthetic materials.

The roof 102 can include a portion of the frame 101 and one or more solar tents 103. For example, a portion of the roof 102 in each section of the solar-powered advertising kiosk 100 that includes one or more solar modules can be referred to as a solar tent 103. In the examples of FIGS. 1-4, the roof 102 includes three solar tents 103, one for each section of the solar-powered advertising kiosk 100. For example, the solar-powered advertising kiosk 100 can have three equally portioned solar tents 103. A solar tent 103 can have one or more sides or facets 112. In an embodiment, the solar tent 103 can serve as an "umbrella" for the solar-powered advertising kiosk 100. The solar tent 103 can provide a shade for bypassing pedestrians. The solar tent 103 can also partially block direct sunlight so that an advertising display 104 becomes more visible.

In some embodiments, a solar tent 103 can include one or more solar modules 106. A solar module 106 can include one or more solar cells. The solar module 106 can vary in length. For example, a solar module 106 at the bottom of a facet 112 of a solar tent 103 can have a longer length than a solar module 106 at the top of the facet 112. In some embodiments, a solar tent 103 can include one or more solar modules 106 that are arranged in a tile-like fashion, for example, as illustrated in the embodiments in FIGS. 1, 2, and 4. In other embodiments, a solar tent 103 can be made of one or more solar sheets 111, for example, as illustrated in FIG. 3.

The body 105 can include a portion of the frame 101, one or more advertising displays 104, and a storage compartment 107. In some embodiments, the body 105 can also include one or more seat surfaces 108 and/or one or more charging stations 109. An advertising display 104 can display one or more advertisements, public announcements, etc. In an embodiment, an advertising display 104 can be included in a lightbox with internal lighting. For example, an advertising display 104 can be provided on one or more sides of a lightbox, as described below. For example, an advertising display 104 can display a film on which an advertisement is printed. In some embodiments, an advertising display 104 can be a digital display. The storage compartment 107 can store control electronics (e.g., control electronics 402 as described in FIG. 12), one or more batteries (e.g., one or more batteries 403 as described in FIG. 12), and/or a computer system (e.g., as described in FIG. 17). The seat surface 108 can provide seating for people. For example, each section of the solar-powered advertising kiosk 100 can include a seat surface 108. For example, the seat surface 108 can provide a shaded resting area covered by a solar tent 103. A charging station 109 can provide one or more charging outlets for people to charge mobile devices and/or other computing devices. In an embodiment, a seat surface 108 can be made from any material, for example, from which the frame 101 can be made. In some embodiments, a seat surface 108 can be made of any combination of metal, metal alloys, wood, and/or synthetic materials.

The solar-powered advertising kiosk 100 can be assembled, joined, and/or connected by any suitable mechanical means or other means. Different parts or components of the frame 101 can be held together, for example, by butt joints. For example, butt joints can be butt joints 206 in FIG. 5. The solar modules 106 and/or the solar sheets 111 can be anchored to the frame 101 and a framework of structural tubes, for example, by mounting joints. For example, the solar modules 106 and/or the solar sheets 111 can be anchored by mounting joints, for example, along dotted lines between two anchoring points 208 of a structural tube framework 207 in FIG. 5.

FIG. 1 illustrates a first embodiment of a solar-powered advertising kiosk 100. In the example of FIG. 1, the solar-powered advertising kiosk 100 includes a frame 101, a roof 102, a plurality of solar tents 103, a plurality of advertising displays 104, a body 105, a plurality of solar modules 106, and a plurality of storage compartment 107. The frame 101 can include a portion for the roof 102 and a portion for the body 105. The frame 101 divides the solar-powered advertising kiosk 100 into three sections. Each of the three sections includes a respective solar tent 103, two advertising displays 104, and two storage compartments 107. A number of different parts or components of the solar-powered advertising kiosk 100 can vary depending on the embodiment. For example, in some embodiments, a section of the solar-powered advertising kiosk 100 can include one storage compartment 107. In the example of FIG. 1, a plurality of solar modules 106 is arranged in a tile-like manner. For example, each solar tent 103 includes a total of fourteen solar modules 106. Each solar tent 103 includes two facets 112. For example, each facet 112 includes seven solar modules 106.

FIG. 2 illustrates a second embodiment of a solar-powered advertising kiosk 100. The solar-powered advertising kiosk 100 of FIG. 2 may include similar components as the solar-powered advertising kiosk 100 of FIG. 1. In the example of FIG. 2, the solar-powered advertising kiosk 100 can also include one or more seat surfaces 108. For instance, each section of the solar-powered advertising kiosk 100 can include a seat surface 108. A seat surface 108 can be supported by a seat support structure 110. The seat support structure 110 can be an interior seat support structure. A seat support structure 100 can be provided for each seat surface 108. In the example of FIG. 2, the solar-powered advertising kiosk 100 can also include one or more charging stations 109. A charging station 109 can provide one or more charging outlets for charging computing devices, such as mobile phones.

FIG. 3 illustrates a third embodiment of a solar-powered advertising kiosk 100. The solar-powered advertising kiosk 100 in FIG. 3 may include similar components as the solar-powered advertising kiosk 100 of FIG. 1 or 2. In the example of FIG. 3, the solar-powered advertising kiosk 100 can have solar tents 103 that are made of one or more solar sheets 111. For example, each solar tent 103 includes two solar sheets 111 and has two facets 112. In some embodiments, each solar tent 103 can include one combined solar sheet 111.

FIG. 4 illustrates a fourth embodiment of a solar-powered advertising kiosk 100. The solar-powered advertising kiosk 100 in FIG. 4 may include similar components as the solar-powered advertising kiosk 100 of FIGS. 1-3. FIG. 4 provides a front plan view of the solar-powered advertising kiosk 100. For example, the solar-powered advertising kiosk 100 of FIG. 4 can be the front plan view of the solar-powered advertising kiosk 100 of FIG. 1. FIG. 4 can illustrate a flat view of two sections of the solar-powered advertising kiosk 100 prior to folding. The shape of the frame 101 in the roof 102 is shown in dotted lines.

Figure 5:
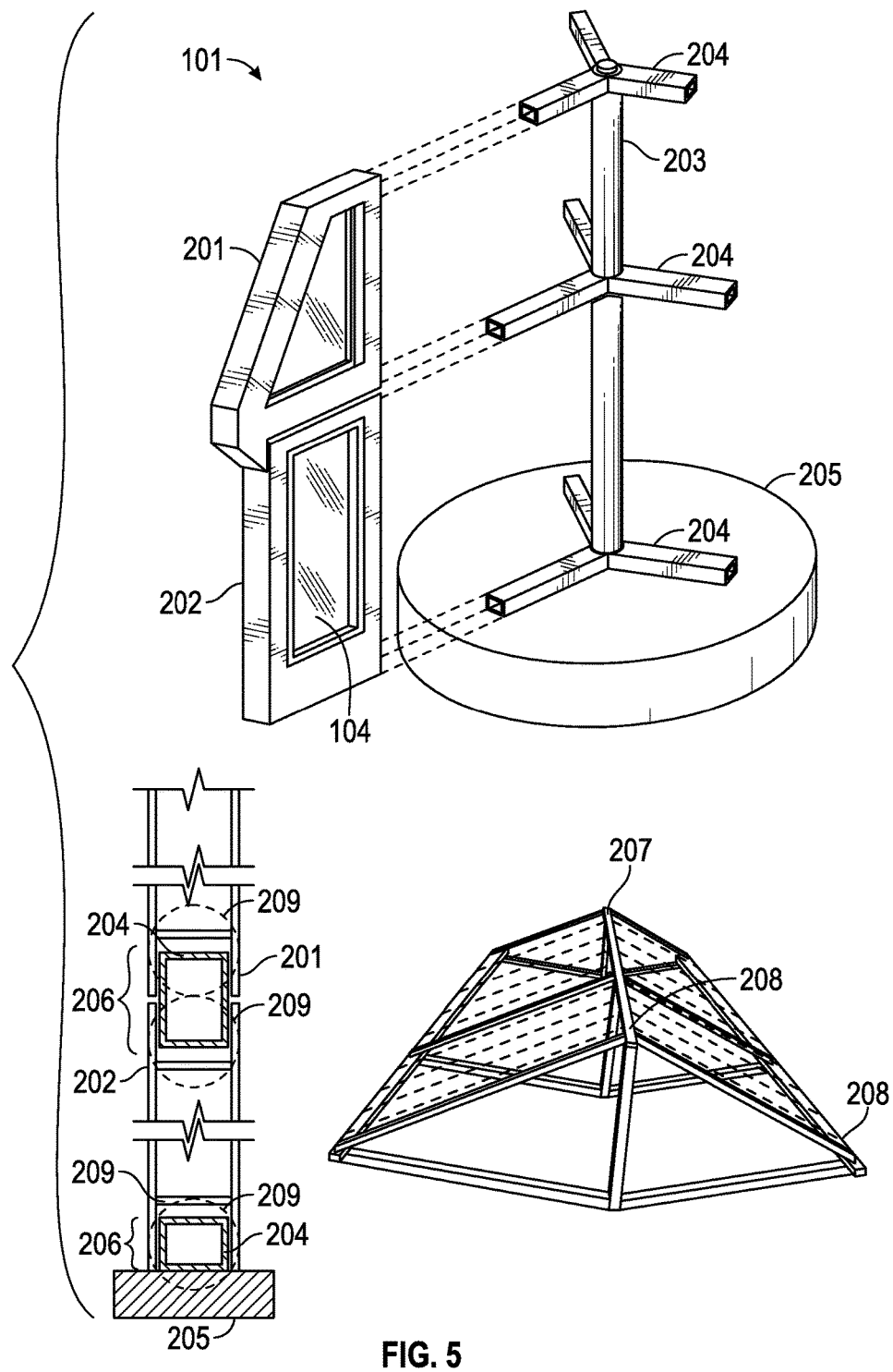
FIG. 5 provides a perspective view of a frame of a solar-powered advertising kiosk, according to an embodiment of the present disclosure.

FIG. 5 provides a perspective view of a frame 101 of a solar-powered advertising kiosk 100, according to an embodiment of the present disclosure. The frame 101 can include one or more framing rafters 201, one or more framing panels 202, and a framing post 203. The framing rafter 201 can provide support for the roof 102 of the solar-powered advertising kiosk 100. The framing panel 202 can include one or more advertising displays 104. The framing post 203 can have one or more arms or sleeves 204 that radially extend from the center of the framing post 203. In some embodiments, the framing rafter 201 and/or the framing panel 202 can be made from aluminum. In some embodiments, the framing post 203 can be made from steel. The one or more arms 204 can divide the solar-powered advertising kiosk 100 into corresponding one or more sections. In an embodiment, the framing post 203 can be structurally anchored to a base 205. In some embodiments, the base 205 can be made from concrete.

Figure 10:
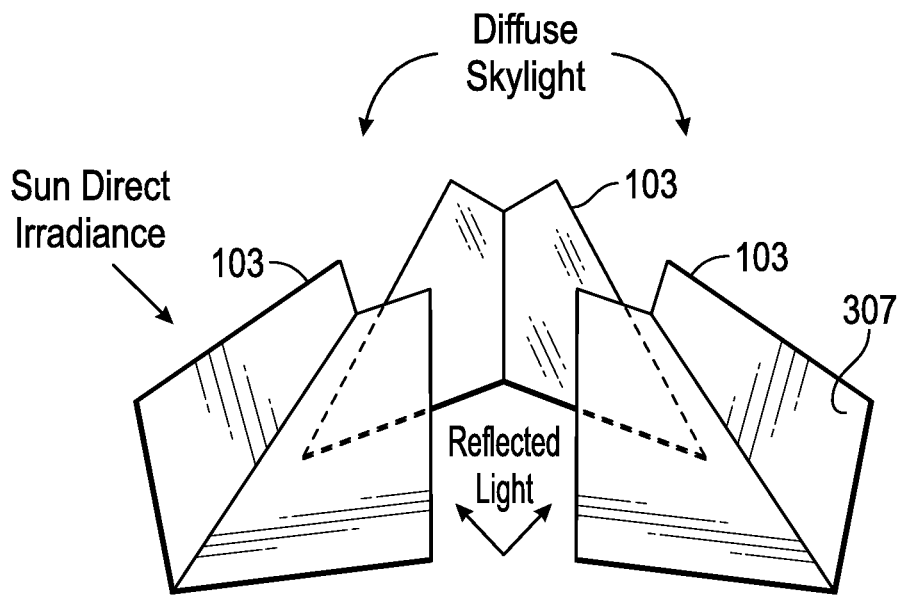
FIG. 10 provides an exploded perspective view of a solar tent including one or more bifacial solar modules, according to an embodiment of the present disclosure.

Any two framing rafters 201 can provide an anchor for a solar tent 103 of a solar-powered advertising kiosk 100. A solar tent 103 can be mechanically supported by a structural tube framework or armature 207. For example, if the solar-powered advertising kiosk 100 includes three sections, the solar tent 103 for each section can be supported by its own structural tube framework 207. In some embodiments, the structural tube framework 207 can divide a solar tent 103 into one or more facets 112. For example, the structure tube framework 207 can divide the solar tent 103 into two facets 112 as illustrated in FIGS. 2 and 3. In other embodiments, the structural tube framework 207 does not divide the solar tent 103 into one or more facets 112. For example, a solar tent 103 can have only one facet 112. The structural tube framework 207 can be made from any material, for example, from which the frame 101 can be made. In some embodiments, the structural tube framework 207 can be made of any combination of metal, metal alloys, wood, and/or synthetic materials. In an embodiment, the structural tube framework 207 can be made of steel tubes. As an example, steel tubes can be hollow. The framing rafter 201 and the structural tube framework 207 can be mechanically held together by any suitable means. For example, the framing rafter 201 and the structural tube framework 207 can be held together by welds, by pre-drilled inserts, or by mounting brackets. The structural tube framework 207 can have one or more anchoring points 208, where one or more solar modules 106 can be installed in a tile-like fashion as illustrated in FIG. 2. For example, the anchoring points 208 can be the same as or similar to anchoring points 304 as shown in FIG. 10. The dotted line across the structural tube framework 207 can depict an approximate location or position where the solar module 106 can be installed. In some embodiments, the structural tube framework 207 may include anchoring points for one or more solar sheets 111 as illustrated in FIG. 3.

In an embodiment, the framing rafter 201, the framing panel 202, and the framing post 203 can be mechanically held together by one or more butt joints 206. The butt joint 206 can include one or more mechanical inserts 209, one or more arms 204, and fastening hardware. The framing rafter 201 and the framing panel 202 can be manufactured with mechanical inserts 209 that are mechanically aligned with arms 204 of the framing post 203. The mechanical inserts 209 and the arms 204 can have match-drill holes. Once the framing post 203 is anchored to a base 205, the framing rafters 201 and the framing panels 202 can slide into the framing post 203 using arms 204 as guides. The framing rafters 201, the framing panels 202, and the framing post 203 can be secured using the match-drill holes by screws, nuts, bolts, pins, or any other suitable means. The modularity of the frame 101 can facilitate transport of the frame 101 and allow the frame 101 to be assembled on site.

In the example of FIG. 5, the solar-powered advertising kiosk 100 includes three sections, and components of the solar-powered advertising kiosk 100 to be assembled on site can include three framing rafters 201, three framing panels 202 each including two advertising displays 104, a framing post 203 including nine arms, three structural tube frameworks 207, 42 solar modules 106, one or more batteries, and one or more LED lights.

Figure 6:
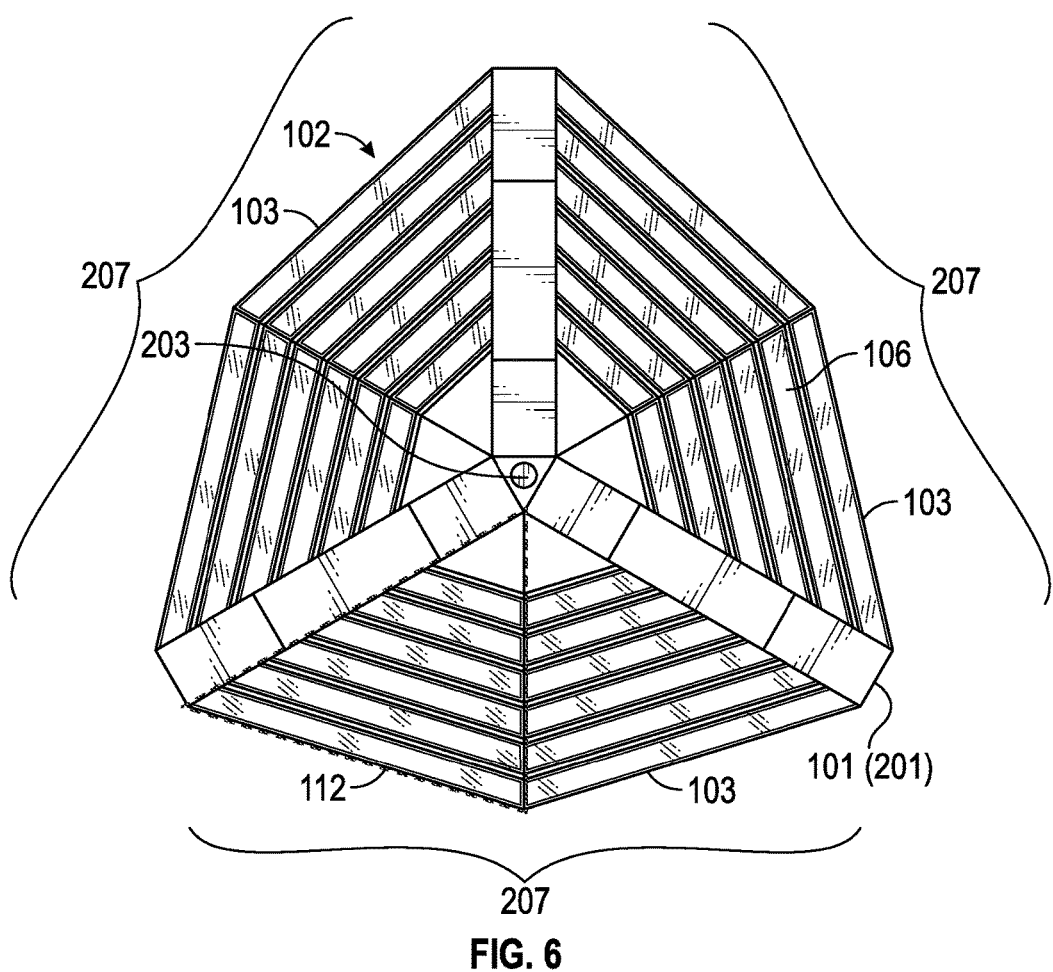
FIG. 6 provides a top-down view of a roof of a solar-powered advertising kiosk, according to an embodiment of the present disclosure.
Figure 7:
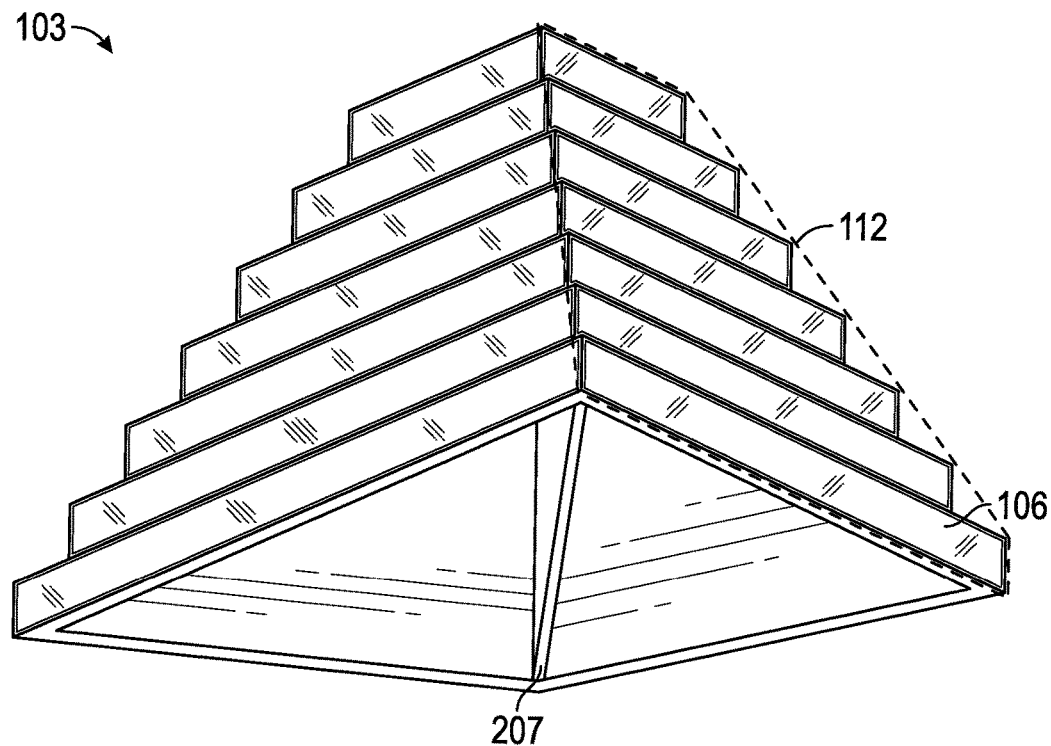
FIG. 7 provides a perspective view of a roof of a solar-powered advertising kiosk, according to an embodiment of the present disclosure.
Figure 8:
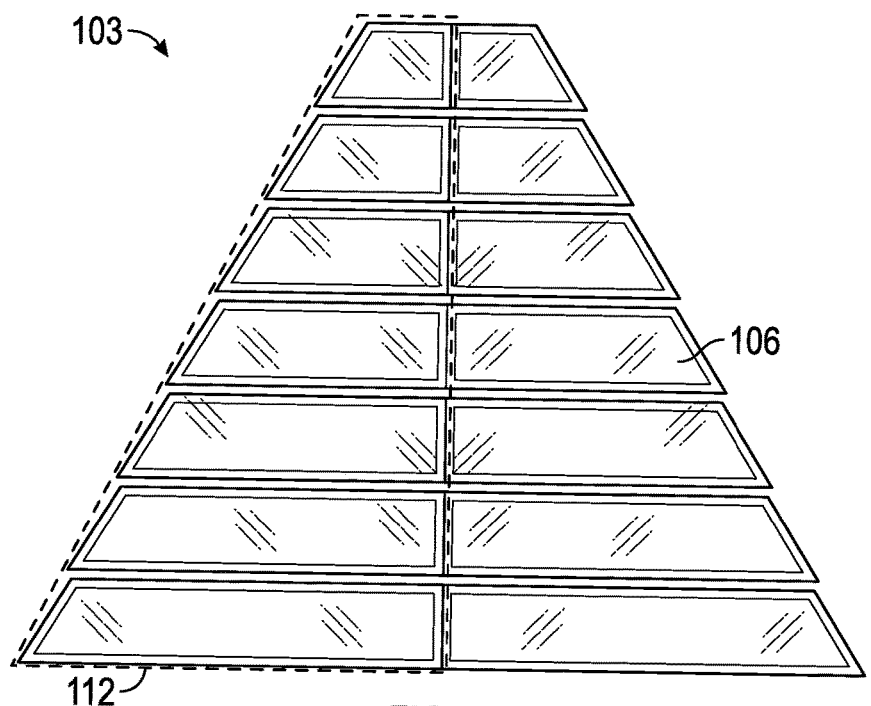
FIG. 8 provides a front plan view of a roof of a solar-powered advertising kiosk, according to an embodiment of the present disclosure.

FIGS. 6-8 provide various views of a roof 102 of a solar-powered advertising kiosk 100, according to an embodiment of the present disclosure. FIG. 6 provides a top-down view of a roof 102 of a solar-powered advertising kiosk 100, according to an embodiment of the present disclosure. In some embodiments, the roof 102 can include a portion of a frame 101 (e.g., one or more framing rafters 201), one or more structural tube framework 207, and one or more solar tents 103. A framing post 203 can fit with the framing rafters 201 to form the roof 102. In an embodiment, the solar tent 103 can include one or more solar modules 106 as illustrated in FIG. 2. In another embodiment, the solar tent 103 can include one or more solar sheets 111 as illustrated FIG. 3. In some embodiments, the roof 102 includes three framing rafters 201 and three solar tents 103 with each solar tent 103 having two facets 112. Each facet 112 further includes seven solar modules 106 anchored to the structural tube framework 207. FIG. 7 provides a perspective view of a roof 102 of a solar-powered advertising kiosk 100, according to an embodiment of the present disclosure. FIG. 7 shows a solar tent 103 that includes two facets 112. Each facet 112 can include seven solar modules 106. The solar tent 103 can include one or more structural tube frameworks 207. FIG. 8 provides a front plan view of a roof 102 of a solar-powered advertising kiosk 100, according to an embodiment of the present disclosure. FIG. 8 shows a solar tent 103 that includes two facets 112. Each facet 112 can include seven solar modules 106.

Figure 9:
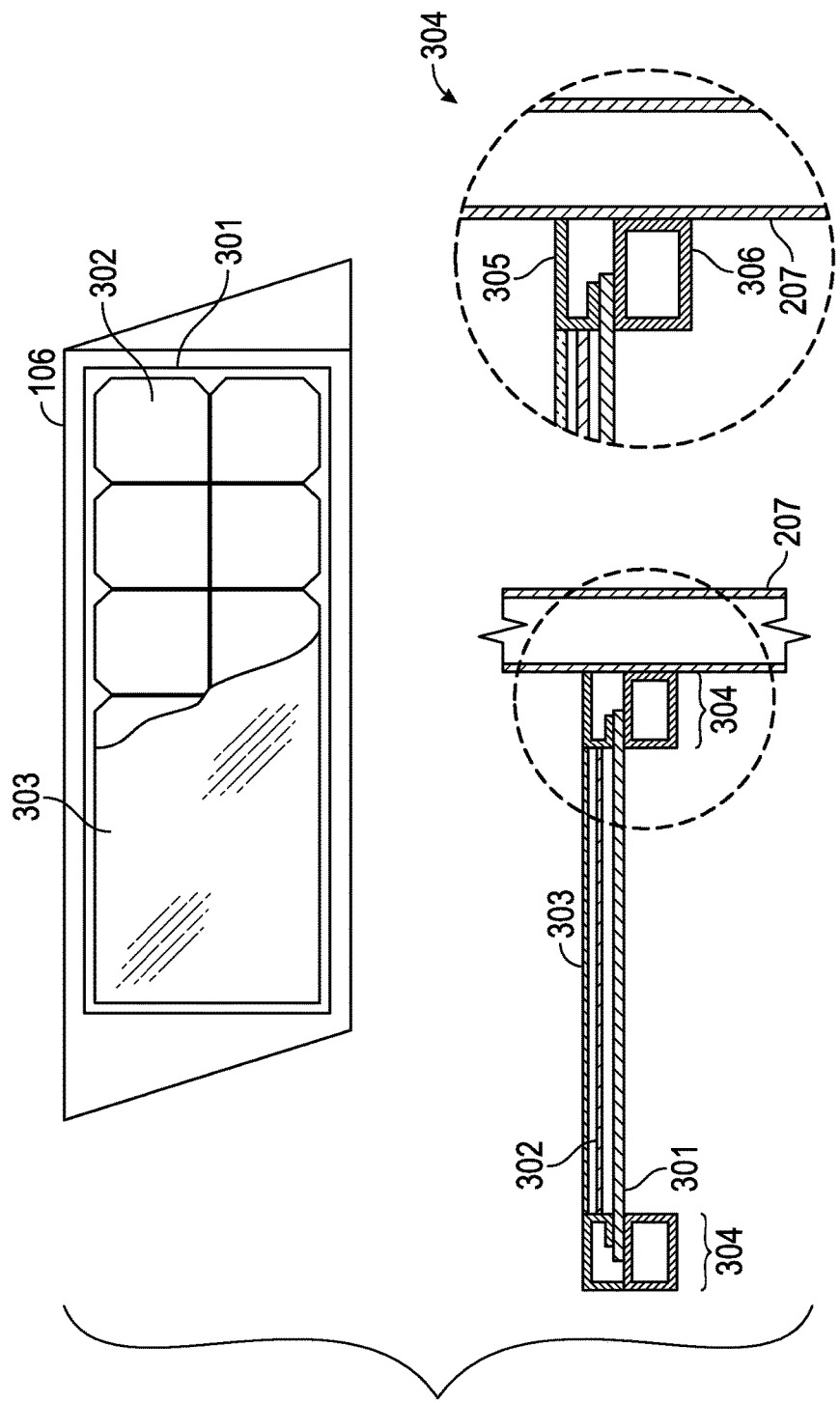
FIG. 9 provides close-up top-down and cross-sectional views of a solar module, according to an embodiment of the present disclosure.

FIG. 9 provides close-up top-down and cross-sectional views of a solar module 106, according to an embodiment of the present disclosure. The solar module 106 can convert sunlight into electricity. In an embodiment, the solar module 106 can include a back plate 301, one or more solar cells 302, and a protective cover 303. The back plate 301 can provide mechanical support for the solar module 106. The back plate 301 can also provide a surface on which solar cells 302 can be placed. For example, solar cells 302 can be laminated onto the back plate 301. The protective cover 303 can protect solar cells 302, for example, from various weather conditions and other environmental factors. The protective cover 303 can be made of any suitable material that allows one or more wavelengths in an electromagnetic (EM) spectrum to pass through a solar module 106. For example, the protective cover 303 can allow a particular wavelength, particular wavelengths, or a range of wavelengths in the EM spectrum to pass through. The one or more wavelengths can be selected as appropriate. In some embodiments, the protective cover 303 can have a thickness that varies from 0.55 mm to 2.0 mm. In some embodiments, the protective cover 303 can have a softening point of 896° C. In some embodiments, the protective cover 303 can have an annealing point of 627° C. In some embodiments, the protective cover 303 can have a strain point of 573° C. In some embodiments, the protective cover 303 can have a density of 2.39 g/cm$^3$. In some embodiments, the protective cover 303 can have a Young's modulus of 68.0 GPa. In some embodiments, the protective cover 303 can have a Poisson's ratio of 0.22. In some embodiments, the protective cover 303 can have a Shear modulus of 27.9 GPa. In some embodiments, the protective cover 303 can have a Vickers hardness number (e.g., for 200 g load) of 551 kgf/mm$^2$ for unstrengthened. In some embodiments, the protective cover 303 can have a Vickers hardness number (e.g., for 200 g load) of 654 kgf/mm$^2$ for strengthened. In some embodiments, the protective cover 303 can have a coefficient of expansion of $75.5 \times 10^{-7}$° C. In some embodiments, the protective cover 303 can have a fracture toughness of 0.69 MPa*m$^{0.5}$. In some embodiments, the protective cover 303 can have over 90% transmittance or transmission between a wavelength of 300 nm to 2500 nm. For reference, visible light can correspond to a wavelength of 400 nm to 700 nm. In an embodiment, the protective cover 303 can be made from Corning® Gorilla® glass.

In an embodiment, anchoring points 304 can extend from a structural tube framework 207 that can be used to anchor a solar module 106. The anchoring points 304 can include a top portion 305 and a bottom portion 306. A solar module 106 can be inserted between the top portion 305 and the bottom portion 306. For example, the top portion 305 and the bottom portion 306 can have grooves in which the back plate 301 of the solar module 106 can be inserted and secured, for example, with fastening hardware.

FIG. 10 provides an exploded perspective view of a solar tent 103 including one or more bifacial solar modules 307, according to an embodiment of the present disclosure. For example, a solar module 106 can be a bifacial solar module 307. Exterior of the solar tent 103 can capture sun direct irradiance and diffuse skylight. For example, an exterior or front side of a bifacial solar module 307 in a solar tent 103 can capture sun direct irradiance and diffuse skylight. Interior of the solar tent 103 can capture reflected light. For example, an interior or back side of a bifacial solar module 307 in a solar tent 103 can capture reflected light from light entering the interior of the tent 103.

Figure 11:
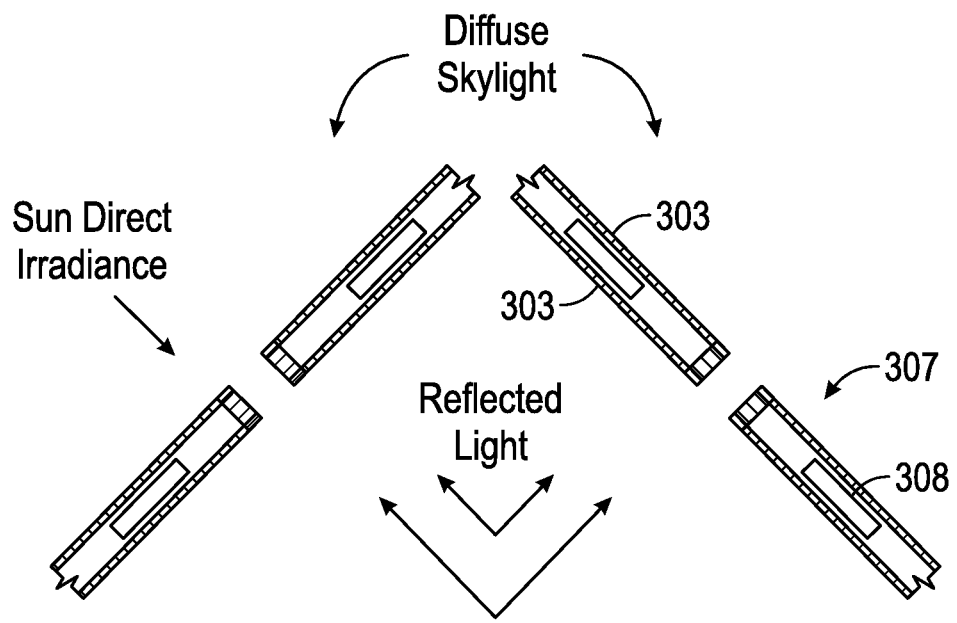
FIG. 11 provides a cross-sectional view of one or more bifacial solar modules, according to an embodiment of the present disclosure.

FIG. 11 provides a cross-sectional view of one or more bifacial solar modules 307, according to an embodiment of the present disclosure. A bifacial solar module 307 can include one or more bifacial solar cells 308. A bifacial solar module 307 can capture direct and diffuse skylight on an exterior or front side and capture reflected light on an interior or back side. Because the bifacial solar module 307 can capture both direct and reflected sunlight, the bifacial solar module 307 can output more power than a single-sided solar module. In some embodiments, an interior of a solar-powered advertising kiosk 100 can be white-coated to increase light reflectance to the back side of the bifacial solar module 307. In an embodiment, the bifacial solar module 307 can have protective covers 303 both on the front side and on the back side. The protective covers 303 in FIG. 11 can have the same characteristics as the protective covers 303 described above. In an embodiment, the protective cover 303 can be made from Corning® Gorilla® glass. The back side of the bifacial solar module 307 may capture reflected light from the protective cover 303 on the back side and/or from white-coated interior of the solar tent 103, such as a structural tube framework 207.

Figure 12:
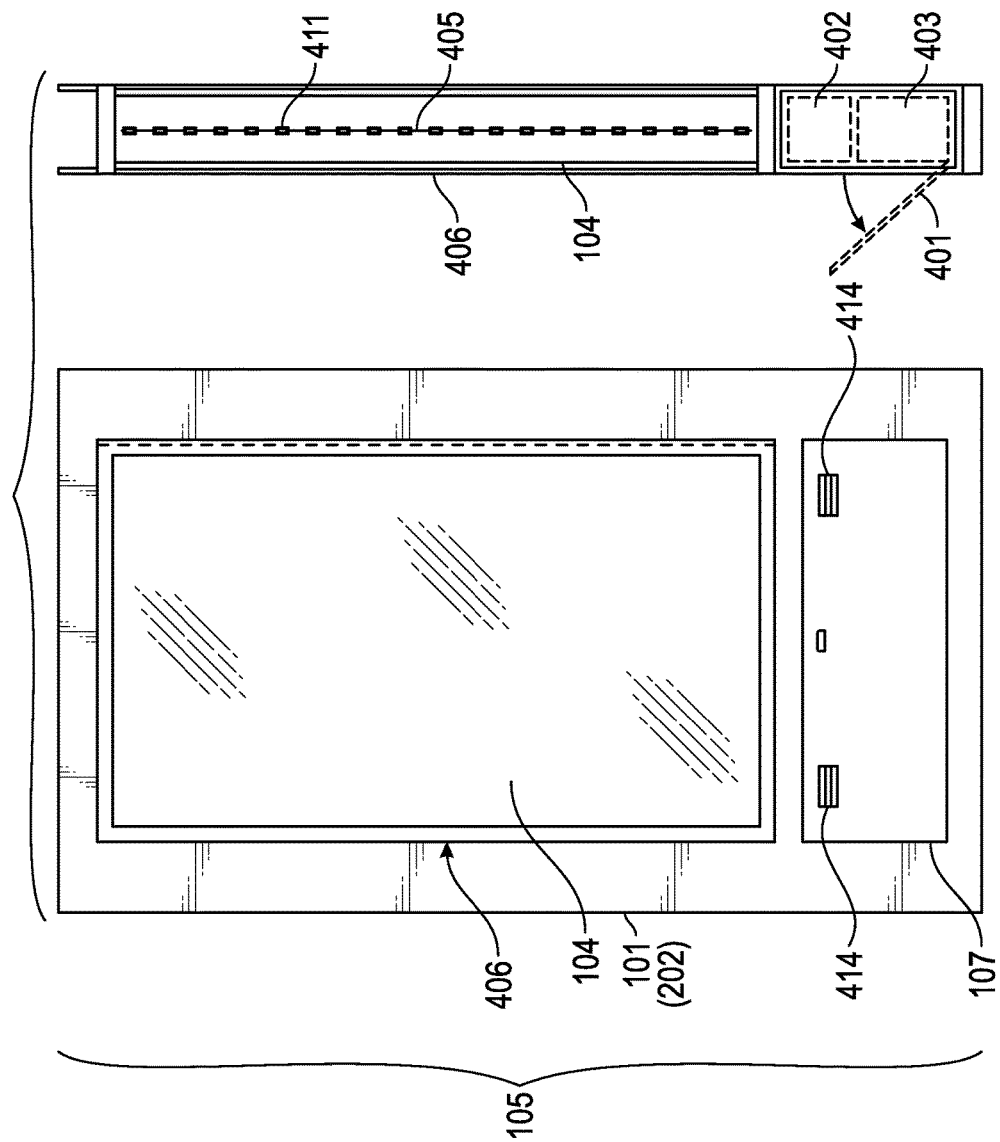
FIG. 12 provides a front plan view and a side cross-section view of a body of a solar-powered advertising kiosk, according to an embodiment of the present disclosure.

FIG. 12 provides a front plan view and a side cross-section view of a body 105 of a solar-powered advertising kiosk 100, according to an embodiment of the present disclosure. In an embodiment, the body 105 can include a portion of the frame 101 (e.g., a framing panel 202), one or more advertising displays 104, and a storage compartment 107. In an embodiment, the body 105 can also include one or more seat surfaces and one or more charging stations (e.g., one or more seat surfaces 108 and one or more charging stations 109 in FIGS. 2 and 3).

In an embodiment, the advertising display 104 can be a lightbox or can be included in a lightbox. For example, the lightbox can have internal backlight. In another embodiment, the advertising display 104 can be a large-format light emitting diode (LED) monitor that can be configured with a computing system to dynamically shuffle or rotate advertising graphics for a predetermined time period. For example, the computing system can be a computer system as described in FIG. 17. Advertisements may be displayed on one or more sides of the lightbox. For example, advertisements can be displayed on one or two sides of the lightbox. Any light source can be used as backlight. In an embodiment, backlight can be light emitting diode (LED) lights 411. For example, the LED lights 411 can be installed on a back plate 405. The advertising display 104 can include a transparent door 406.

Moreover, in an embodiment, the body 105 can include a storage compartment 107. The storage compartment 107 can include a door 401. In some embodiments, the door 401 can include one or more door vents 414. In some embodiments, the storage compartment 107 can include control electronics 402, one or more batteries 403, and/or a computer system (e.g., a personal computer, a server, etc.). The control electronics 402 can deliver solar and/or battery power to the advertising display 104. In some embodiments, the control electronics 402 can be a battery charger or a controller. For example, the control electronics 402 can be a maximum power point tracking (MPPT) battery charger or controller. In some embodiments, the control electronics 402 can be controlled by another computing device or system that is remote from the solar-powered advertising kiosk 100, such as a server or client device as described in FIG. 17. In some embodiments, the control electronics 402 can convert higher voltage direct current (DC) output from solar modules 106 down to a lower voltage needed to charge the battery 403. The control electronics 402 can maximize energy harvest from the solar modules 106 as well as provide load control. The control electronics 402 can be controlled directly by switches and/or via a connection to the computer system. The control electronics 402 can charge or recharge the battery 403, for example, when there is abundance of solar power. In some embodiments, the control electronics 402 can have a peak efficiency of at least 97.5%. In some embodiments, the control electronics 402 can support a battery charging current of 15 amps. In some embodiments, the control electronics 402 can support a battery voltage range between 7 to 36 V. In some embodiments, the control electronics 402 can support a photovoltaic (e.g., solar cells 302) open circuit voltage up to 75 V. In some embodiments, the control electronics 402 can have an operating temperature between −40° C. to +60° C. In some embodiments, the control electronics 402 can operate in 100% humidity. In some embodiments, the control electronics 402 can connect to the computer system. In an embodiment, the control electronics 402 can be Morningstar's SunSaver MPPT™. The battery 403 can be rechargeable. The battery 403 can be of any type. For example, a lithium-ion battery can be used.

Furthermore, in an embodiment, the control electronics 402 can be coupled to a computer system, for example, via a computer network. The control electronics 402 can be remotely controlled and/or monitored by the computer system. The computer system will be discussed in more detail below with reference to FIG. 17. The computer network can include any type of communication network, including a local-area network (LAN), a wide-area network (WAN), the Internet, a wireless network, a wireless wide-area network (wWAN), a telephone network, a cellular communications network, etc., or any combination thereof.

A solar-powered advertising kiosk 100 can be powered by any internal or external power source, or any combination thereof. In an embodiment, the solar-powered advertising kiosk 100 can be powered entirely by the solar modules 106. In another embodiment, when an amount of sunlight is insufficient (e.g., does not satisfy a threshold value), the solar-powered advertising kiosk 100 can be powered by both the solar modules 106 and the battery 403. In yet another embodiment, with no sunlight, the solar-powered advertising kiosk 100 can be solely powered by the battery 403. If needed, the solar-powered advertising kiosk 100 can also be powered by external energy sources (e.g. an electric grid, wind energy, etc.). Many variations are possible.

Figure 13:
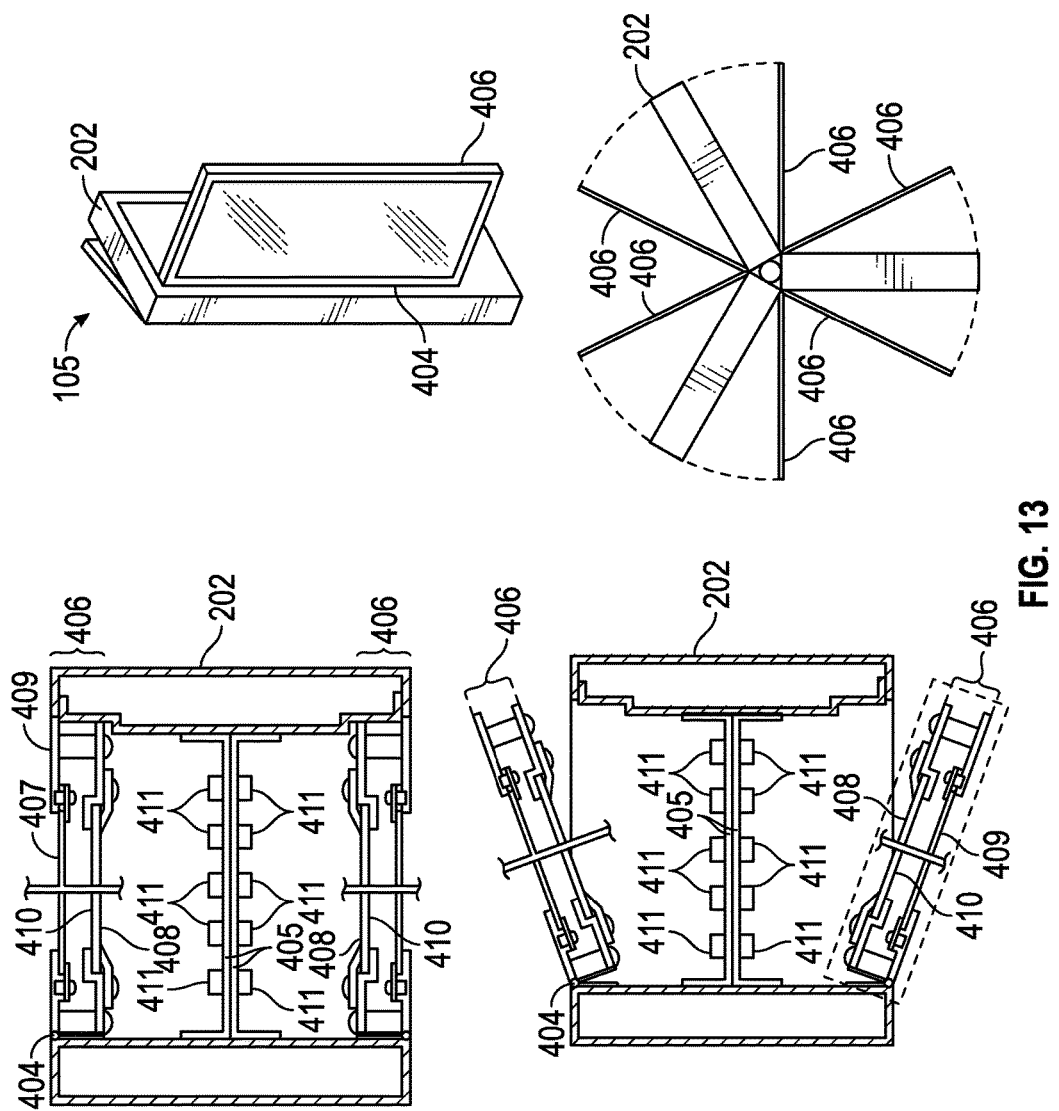
FIG. 13 provides cross-sectional views, a top-down view, and a perspective view of a body of a solar-powered advertising kiosk, according to an embodiment of the present disclosure.

FIG. 13 provides cross-sectional views, a top-down view, and a perspective view of a body 105 of a solar-powered advertising kiosk 100, according to an embodiment of the present disclosure. In an embodiment, an advertising display 104 can be integrated into a framing panel 202. In an embodiment, the advertising display 104 can be a lightbox or included in a lightbox. In some embodiments, the advertising display 104 can be provided on one side of the lightbox. In other embodiments, the advertising display 104 can be provided on both sides of the lightbox. The advertising display 104 can include a hinge 404, a back plate 405, and a transparent door 406. The hinge 404 can run along a long-edge of the advertising display 104. The hinge 404 can allow the transparent door 406 to open and close. In some embodiments, the hinge 404 can be a piano hinge. For example, a piano hinge can be a hinge that has a thin pin joint and extends along the full length of the part to be moved. The transparent door 406 can include a clear rigid front 407, a clear rigid back 408, and a door frame 409. The door frame 409 can include various mechanical mounting points. The mechanical mounting points can be used to secure the clear rigid front 407 and the clear rigid back 408 to the door frame 409. The clear rigid front 407 and the clear rigid back 408 can be made of any material that has transparent properties. In an embodiment, the clear rigid front 407 can be tempered glass. In an embodiment, the clear rigid back 407 can be acrylic. The door frame 409 can be made from any suitable material, for example, from which the frame 101 can be made. In some embodiments, the door frame 409 can be made of any combination of metal, metal alloys, wood, and/or synthetic materials.

In an embodiment, the transparent door 406 can house an advertising graphic film 410. The advertising graphic film 410 can include a graphic for advertising. For example, an advertisement can be printed on the advertising graphic film 410. In some embodiments, the advertising graphic film 410 can be made of vinyl material. In some embodiments, the advertising graphic film 410 can have a matte finish. In some embodiments, the advertising graphic film 410 can withstand a temperature range between −54° C. to +66° C. In some embodiments, the advertising graphic film 410 can be resistant to alkalis, acids, salt, water, and/or oils. In an embodiment, the advertising graphic film 410 can be made from 3M® Décor Overlaminate. The advertising graphic film 410 can be installed on the clear rigid back 408. For example, the advertising graphic film 410 can be inserted between the mounting points and the clear rigid back 408 of the transparent door 406. Similar to a protective cover 303 of a solar module 106, the clear rigid front 407 can protect the advertising graphic film 410 from various weather conditions and/or other environmental factors.

Moreover, in an embodiment, the advertising display 104 can include a back plate 405. The back plate 405 can also provide a surface on which LED lights 411 can be provided. For example, the LED lights 411 can be laminated on the back plate 405. The back plate 405 can be made from any suitable material, for example, from which the frame 101 can be made. In some embodiments, the back plate 405 can be made of any combination of metal, metal alloys, wood, and/or synthetic materials. In an embodiment, the back plate 405 can be made from aluminum. In another embodiment, the back plate 405 can be made from polycarbonate. Many variations are possible. If advertising displays 104 are provided on both sides of a lightbox or a framing panel 202, LED lights 411 can be installed on both sides of the back plate 405 such that advertisements can be displayed on both sides.

Figure 14:
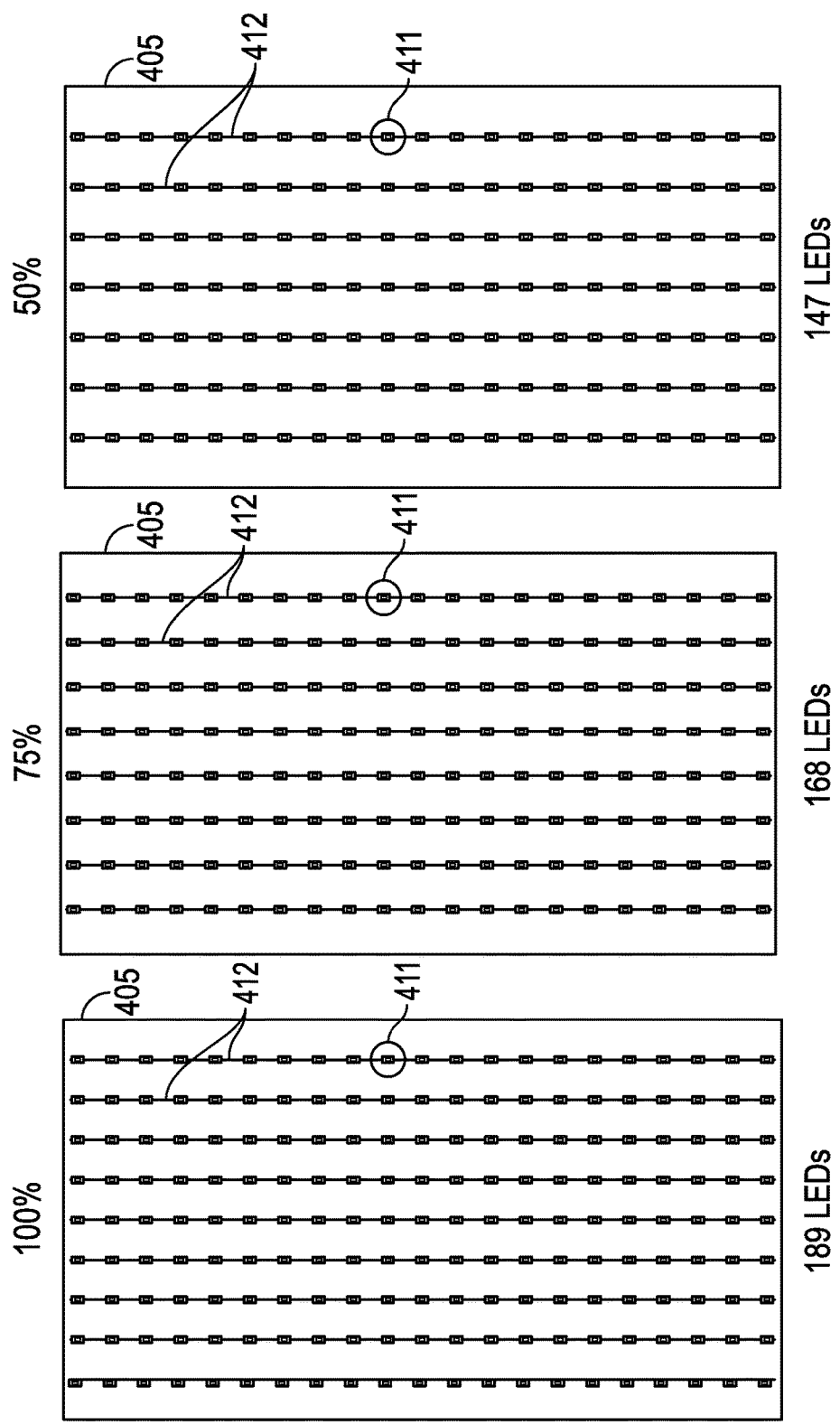
FIG. 14 provides a front plan view of various lighting arrangements on a back plate of an advertising display, according to an embodiment of the present disclosure.

FIG. 14 provides a front plan view of various lighting arrangements on a back plate 405 of an advertising display 104, according to an embodiment of the present disclosure. The lighting arrangement can include one or more rows of LED lights 412, and each row of LED lights 412 can include one or more LED modules 411. The number of rows of LED lights 412 and/or the number of LED modules 411 can be selected as appropriate. In the example of FIG. 14, each row of LED 412 includes 21 LED modules 411. In an embodiment, the lighting arrangement includes nine rows of LED 412 and a total of 189 LED modules 411. For example, this embodiment can be provided under 100% ambient lighting condition. In another embodiment, the lighting arrangement includes eight rows of LED 406 and a total of 168 LED modules 411. For example, this embodiment can be provided under 75% ambient lighting condition. In yet another embodiment, the lighting arrangement includes seven rows of LED 412 and a total 147 LED modules 411. For example, this embodiment can be provided under 50% ambient lighting condition. Depending on the location and the lighting requirement, the back plate 405 of the advertising display 104 can be configured with any one of the three foregoing lighting arrangements. It should be noted here that the LED light arrangements described herein are exemplary only, and other implementations may include additional, fewer, or different lighting technologies.

In some embodiments, the number of rows of LED lights 412 and/or the LED modules 411 to turn on can be determined based on an amount or intensity of ambient light. For example, the solar-powered advertising kiosk 100 can include an ambient sensor that can measure an amount or intensity of ambient light at a location. Depending on the amount or intensity of ambient light, the number of rows of LED lights 412 and/or the LED modules 411 to turn on can vary. For example, a particular lighting arrangement can be selected from various lighting arrangements, such as the three lighting arrangements described above. In other embodiments, the rows of LED lights 412 and/or the LED modules 411 to turn on can be preprogrammed into the control electronics 402. For instance, one or more lighting arrangements, such as the three lighting arrangements described above, can be preprogrammed.

Figure 17:
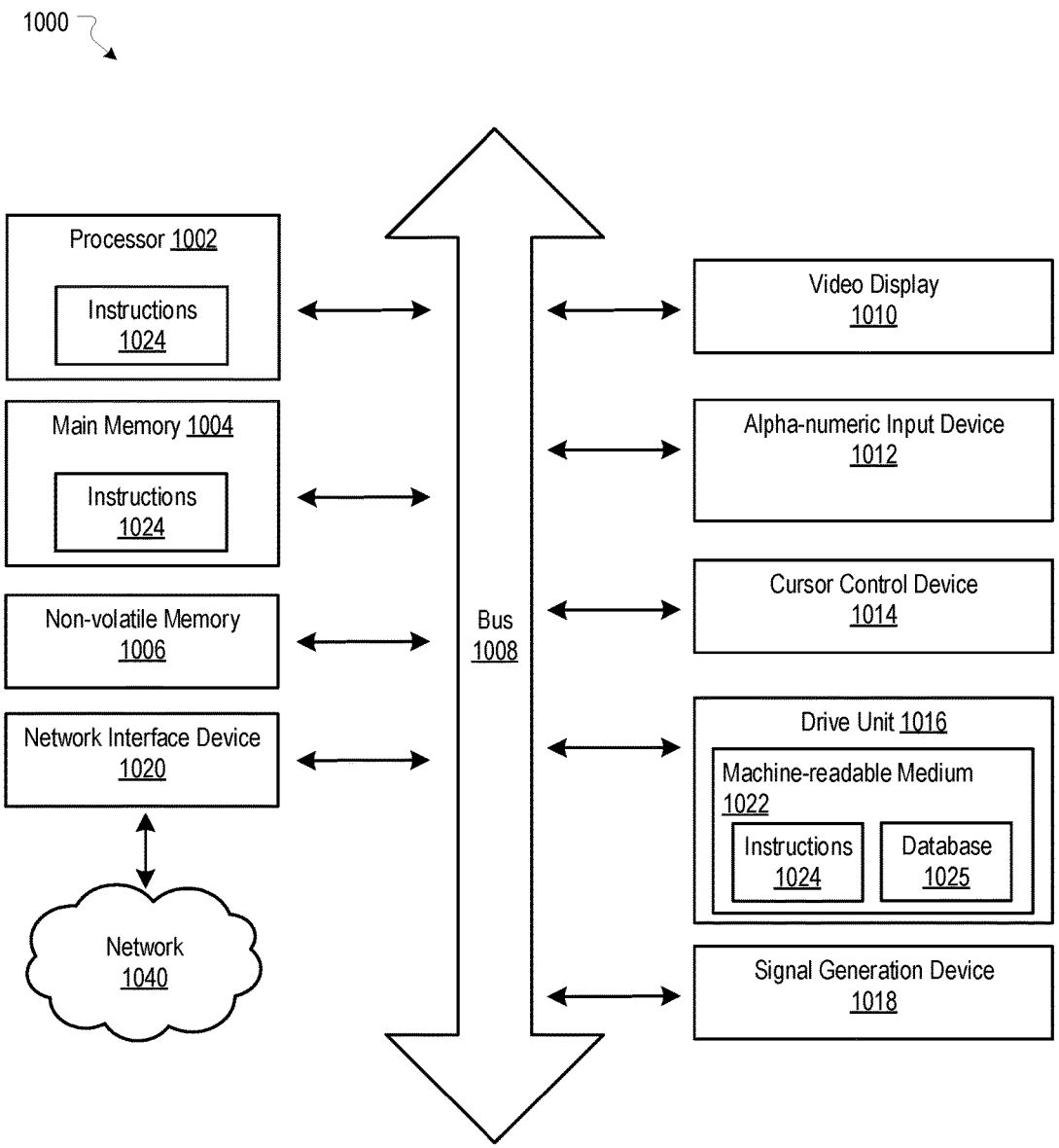
FIG. 17 illustrates an example machine within which a set of instructions for causing the machine to perform one or more of the embodiments described herein can be executed, according to an embodiment of the present disclosure.

Solar-powered advertising kiosks can include one or more additional features. In some embodiments, a kiosk can include a clock. For example, a clock can be a sundial, a digital clock, a solar-powered clock, etc. In certain embodiments, a kiosk can provide seating, as described above. In some embodiments, solar-powered advertising kiosks can provide Wi-Fi connections, charging for devices (e.g., mobile devices), digital displays, etc., as described above. For example, if a kiosk is connected to an electrical grid, advertising displays can be digital advertising displays. Solar-powered advertising kiosks can have various applications and can be used in various settings and contexts. In an example, a kiosk can be provided in outdoor spaces, such as malls, downtown areas, parking lots, sidewalks, etc. As another example, a kiosk can be provided at a bus stop or as a bus stop or serve as street furniture. The embodiments of the present technology can be implemented in or in connection with a system or technological environment as shown in FIG. 17. For example, the computer system described in connection with FIG. 17 can be used to control or manage various features or functions associated with solar-powered advertising kiosks. The computer system described in FIG. 17 can constitute, for example, a server (or cloud) computing system or a client computing system in various embodiments. All examples herein are provided for illustrative purposes, and there can be many variations and other possibilities.

Figure 15:
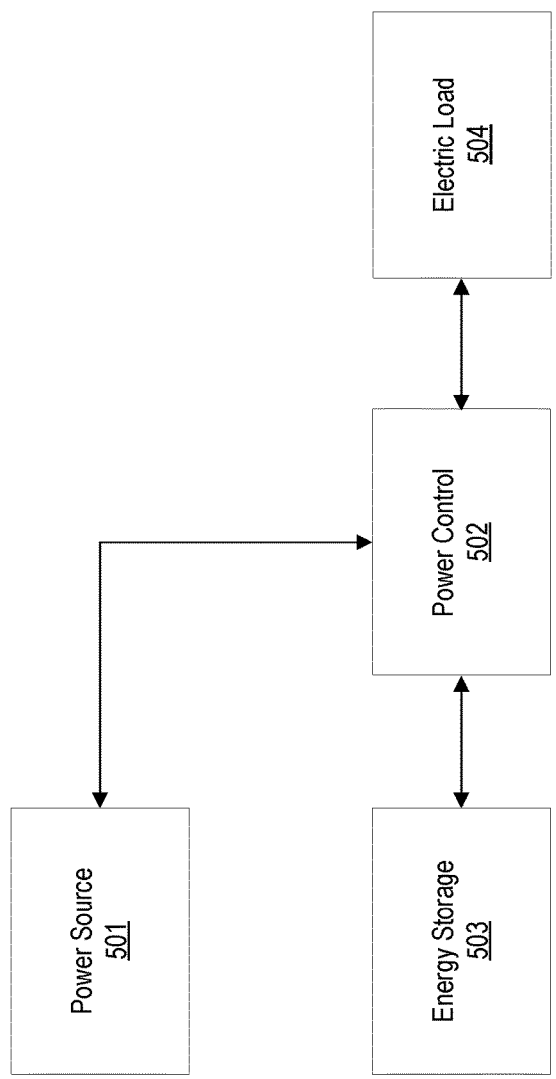
FIG. 15 illustrates an example block diagram including electrical components of a solar-powered advertising kiosk, according to an embodiment of the present disclosure.

FIG. 15 illustrates an example block diagram 500 including electric components of a solar-powered advertising kiosk 100, according to an embodiment of the present disclosure. A power source 501 can generate power and feed the generated power to a power control 502. The power control 502 can condition and deliver the power to an electric load 504. If there is power to spare, e.g., power that is not being used by the electric load 504, the power control 502 can divert excess power to an energy storage 503. When the conditions are such that an amount of power in the power source 501 is not sufficient to support the electric load 504, for example, the amount of power in the power source 501 does not satisfy a threshold value, the energy storage 503 can provide additional power to the power control 502 to continue powering the electric load 504. In some embodiments, the power source 501 can be solar power captured by one or more solar modules 106, the power control 502 can be control electronics 402, the energy storage 503 can be one or more batteries 403, and the electric load 504 can be LED lights 411 that power an advertising display 104 and/or a charging station 109 that people use to charge computing devices. In other embodiments, the power source 501 can include wind power and/or the electric grid.

Figure 16:
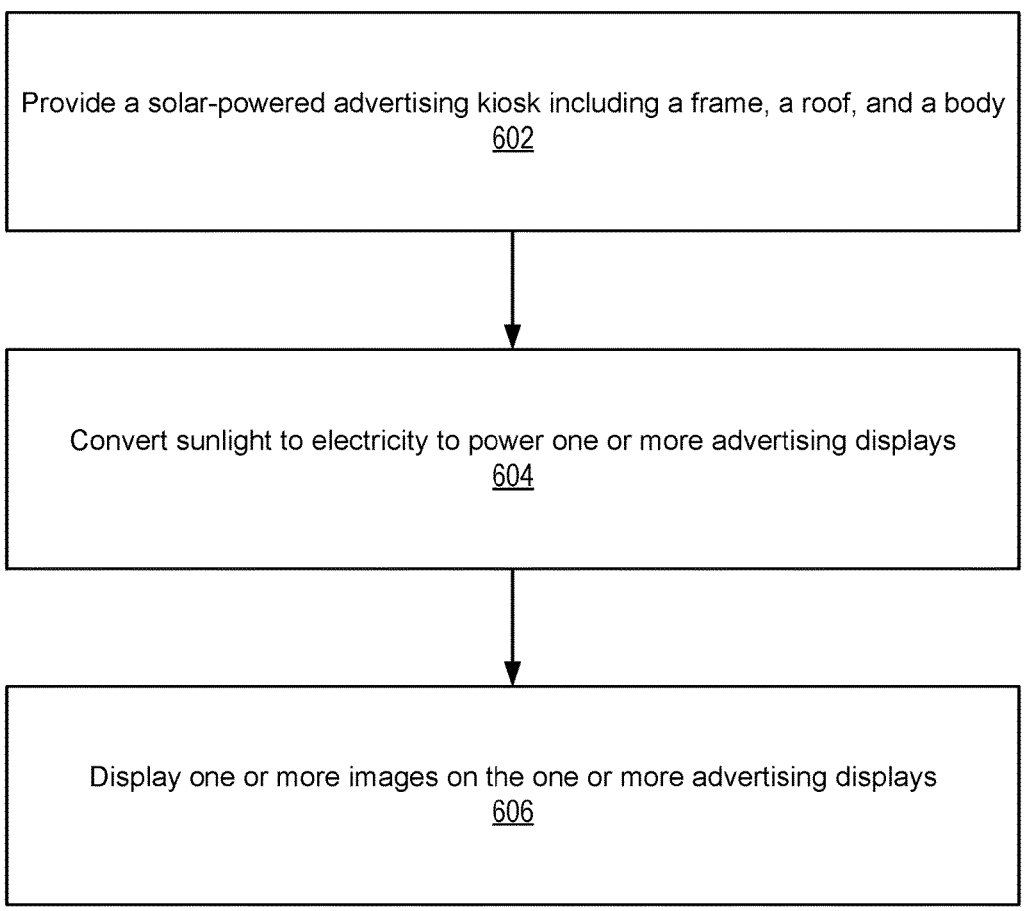
FIG. 16 illustrates an example method for providing a solar-powered advertising kiosk, according to an embodiment of the present disclosure.

FIG. 16 illustrates an example method 600 for providing a solar-powered advertising kiosk, according to an embodiment of the present disclosure. It should be understood that there can be additional, fewer, or alternative steps performed in similar or alternative orders, or in parallel, based on the various features and embodiments discussed herein unless otherwise stated.

At block 602, the example method 600 can provide a solar-powered advertising kiosk including a frame, a roof, and a body. At block 604, the example method 600 can convert sunlight to electricity to power the one or more advertising displays. At block 606, the example method 600 can display one or more images on the one or more advertising displays. Other suitable techniques that incorporate various features and embodiments of the present technology are possible.

Hardware Implementation of Solar-Powered Advertising Kiosks

FIG. 17 illustrates an example machine 1000 within which a set of instructions for causing the machine to perform one or more of the embodiments described herein can be executed, according to an embodiment of the present disclosure. The embodiments can relate to one or more systems, methods, or computer readable media. The machine may be connected (e.g., networked) to other machines. In a networked deployment, the machine may operate in the capacity of a server or a client machine in a client-server network environment, or as a peer machine in a peer-to-peer (or distributed) network environment.

The machine 1000 includes a processor 1002 (e.g., a central processing unit (CPU), a graphics processing unit (GPU), or both), a main memory 1004, and a nonvolatile memory 1006 (e.g., volatile RAM and non-volatile RAM), which communicate with each other via a bus 1008. In some cases, the example machine 1000 can correspond to, include, or be included within a computing device or system. For example, in some embodiments, the machine 1000 can be a desktop computer, a laptop computer, personal digital assistant (PDA), an appliance, a wearable device, a camera, a tablet, or a mobile phone, etc. In one embodiment, the machine 1000 also includes a video display 1010, an alphanumeric input device 1012 (e.g., a keyboard), a cursor control device 1014 (e.g., a mouse), a drive unit 1016, a signal generation device 1018 (e.g., a speaker) and a network interface device 1020.

In one embodiment, the video display 1010 includes a touch sensitive screen for user input. In one embodiment, the touch sensitive screen is used instead of a keyboard and mouse. The disk drive unit 1016 includes a machine-readable medium 1022 on which is stored one or more sets of instructions 1024 (e.g., software) embodying any one or more of the methodologies or functions described herein. The instructions 1024 can also reside, completely or at least partially, within the main memory 1004 and/or within the processor 1002 during execution thereof by the computer system 1000. The instructions 1024 can further be transmitted or received over a network 1040 via the network interface device 1020. In some embodiments, the machine-readable medium 1022 also includes a database 1025.

Volatile RAM may be implemented as dynamic RAM (DRAM), which requires power continually in order to refresh or maintain the data in the memory. Nonvolatile memory is typically a magnetic hard drive, a magnetic optical drive, an optical drive (e.g., a DVD RAM), or other type of memory system that maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to any of the computer systems described herein through a network interface such as a modem or Ethernet interface, can also be used.

While the machine-readable medium 1022 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals. The term "storage module" as used herein may be implemented using a machine-readable medium.

In general, the routines executed to implement the embodiments of the present disclosure can be implemented as part of an operating system or a specific application, component, program, object, module or sequence of instructions referred to as "programs" or "applications". For example, one or more programs or applications can be used to execute specific processes described herein. The programs or applications typically comprise one or more instructions set at various times in various memory and storage devices in the machine and that, when read and executed by one or more processors, cause the machine to perform operations to execute elements involving the various aspects of the embodiments described herein.

The executable routines and data may be stored in various places, including, for example, ROM, volatile RAM, non-volatile memory, and/or cache. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of machines, those skilled in the art will appreciate that the various embodiments are capable of being distributed as a program product in a variety of forms, and that the embodiments described herein apply equally regardless of the particular type of machine- or computer-readable media used to actually effect the distribution. Examples of machine readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

What is claimed is:

1. A solar-powered advertising kiosk comprising:
a frame including at least a framing post and two or more arms configured to divide the solar-powered advertising kiosk into two or more sections,
wherein a length of the framing post is configured to stand perpendicular to ground, the length forming a vertical axis,
wherein the two or more arms are provided on the framing post and extend radially from the framing post, and
wherein each of the arms provides support for a roof and a framing panel which includes one or more advertising displays;
the roof configured to convert sunlight to electricity to power the one or more advertising displays, wherein a first portion of the frame includes the roof, and wherein the roof includes one or more solar tents each including one or more solar modules; and
a second portion of the frame includes a body configured to display one or more images on the one or more advertising displays.

2. The solar-powered advertising kiosk of claim 1, wherein the first portion includes one or more framing rafters each mechanically coupled with a corresponding arm and provides support for the roof.

3. The solar-powered advertising kiosk of claim 2, wherein the second portion includes one or more framing panels.

4. The solar-powered advertising kiosk of claim 3, wherein the framing post is configured to fit with the one or more framing rafters to form the roof and to fit with the one or more framing panels to form the body.

5. The solar-powered advertising kiosk of claim 1, wherein the one or more solar modules are bifacial solar modules.

6. The solar-powered advertising kiosk of claim 1, wherein the one or more solar modules include a protective cover on at least one surface of the one or more solar modules.

7. The solar-powered advertising kiosk of claim 6, wherein the protective cover is configured to allow passage of light of a particular wavelength or a particular range of wavelength.

8. The solar-powered advertising kiosk of claim 1, wherein the one or more solar modules include one or more light emitting diode (LED) lights.

9. The solar-powered advertising kiosk of claim 1, further comprising a battery to store the electricity.

10. The solar-powered advertising kiosk of claim 9, further comprising control electronics for controlling the battery.

11. A method comprising:
providing a solar-powered advertising kiosk including:
a frame including at least a framing post and two or more arms configured to divide the solar-powered advertising kiosk into two or more sections,
wherein a length of the framing post is configured to stand perpendicular to ground, the length forming a vertical axis,
wherein the two or more arms are provided on the framing post and extend radially from the framing post, and
wherein each of the arms provides support for a roof and a framing panel which includes one or more advertising displays;
the roof configured to convert sunlight to electricity to power the one or more advertising displays, wherein a first portion of the frame includes the roof, and wherein the roof includes one or more solar tents each including one or more solar modules; and
a second portion of the frame includes a body configured to display one or more images on the one or more advertising displays;
converting sunlight to electricity to power the one or more advertising displays; and
displaying one or more images on the one or more advertising displays.

12. The method of claim 11, wherein the first portion includes one or more framing rafters each mechanically coupled with a corresponding arm and provides support for the roof.

13. The method of claim 12, wherein the second portion includes one or more framing panels.

14. The method of claim 13, wherein the framing post is configured to fit with the one or more framing rafters to form the roof and to fit with the one or more framing panels to form the body.

15. The method of claim 11, wherein the one or more solar modules are bifacial solar modules.

16. The method of claim 11, wherein the one or more solar modules include a protective cover on at least one surface of the one or more solar modules.

17. The method of claim 16, wherein the protective cover is configured to allow passage of light of a particular wavelength or a particular range of wavelength.

18. The method of claim 11, wherein the one or more solar modules include one or more light emitting diode (LED) lights.

19. The method of claim 11, wherein the solar-powered advertising kiosk further comprises a battery to store the electricity.

20. The method of claim 19, wherein the solar-powered advertising kiosk further comprises control electronics for controlling the battery.

* * * * *